US010908462B2

(12) United States Patent
Tong et al.

(10) Patent No.: US 10,908,462 B2
(45) Date of Patent: Feb. 2, 2021

(54) FLEXIBLE SUBSTRATE AND LIQUID CRYSTAL PANEL HAVING THE FLEXIBLE SUBSTRATE

(71) Applicants: BOE TECHNOLOGY GROUP CO., LTD., Beijing (CN); Ordos Yuansheng Optoelectronics Co., Ltd., Inner Mongolia (CN)

(72) Inventors: Jie Tong, Beijing (CN); Xuelu Wang, Beijing (CN); Yan Wang, Beijing (CN); Peimao Li, Beijing (CN); Dongdong Song, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 0 days.

(21) Appl. No.: 15/989,759

(22) Filed: May 25, 2018

(65) Prior Publication Data
US 2019/0094594 A1 Mar. 28, 2019

(30) Foreign Application Priority Data
Sep. 28, 2017 (CN) .......................... 2017 1 0898953

(51) Int. Cl.
G02F 1/1339 (2006.01)
G02F 1/1335 (2006.01)
G02F 1/1333 (2006.01)

(52) U.S. Cl.
CPC .... *G02F 1/13394* (2013.01); *G02F 1/133305* (2013.01); *G02F 1/133512* (2013.01); *G02F 1/133514* (2013.01)

(58) Field of Classification Search
None
See application file for complete search history.

(56) References Cited

U.S. PATENT DOCUMENTS

| 5,739,890 | A | * | 4/1998 | Uda | G02F 1/136277 |
| | | | | | 349/156 |
| 5,889,363 | A | * | 3/1999 | Beeteson | H01J 17/498 |
| | | | | | 313/495 |
| 6,339,462 | B1 | * | 1/2002 | Kishimoto | G02F 1/13394 |
| | | | | | 349/156 |
| 2006/0181661 | A1 | | 8/2006 | Kudou et al. | |

(Continued)

FOREIGN PATENT DOCUMENTS

| CN | 101142517 A | 3/2008 |
| CN | 101223473 A | 7/2008 |

(Continued)

OTHER PUBLICATIONS

First Office Action for Chinese Patent Application No. 201710898953.8 dated Oct. 24, 2019.

*Primary Examiner* — Jessica M Merlin
*Assistant Examiner* — Mark D Teets
(74) *Attorney, Agent, or Firm* — Calfee, Halter & Griswold LLP

(57) ABSTRACT

The present disclosure provides a flexible substrate and a liquid crystal panel having the flexible substrate. The flexible substrate includes a color film substrate and a spacer provided on one side of the color film substrate. The spacer includes a first part and a second part that are intersected with each other.

12 Claims, 3 Drawing Sheets

(56) References Cited

U.S. PATENT DOCUMENTS

2012/0268699 A1* 10/2012 Min .................... G02F 1/13394
349/106
2017/0261796 A1* 9/2017 Tamaki ............. G02F 1/133512

FOREIGN PATENT DOCUMENTS

| CN | 102243397 A | 11/2011 |
| CN | 102612622 A | 7/2012 |
| JP | 2003330011 A | 11/2003 |

* cited by examiner

FLEXIBLE SUBSTRATE AND LIQUID CRYSTAL PANEL HAVING THE FLEXIBLE SUBSTRATE

CROSS REFERENCE

This application is based upon and claims priority to Chinese Patent Application No. 201710898953.8, filed on Sep. 28, 2017, the entire contents thereof are incorporated herein by reference.

TECHNICAL FIELD

The present disclosure relates to a liquid crystal panel technical field, in particular, to a flexible substrate and a liquid crystal panel having the flexible substrate.

BACKGROUND

At present, in a display panel industry, curved surface and flexible display technologies are increasingly concerned. A curved surface OLED (Organic Light-Emitting Diode, organic light-emitting semiconductor) display screen has already been used in publics. Compared with the OLED display screen, the LCD (a liquid crystal panel) has many advantages such as high yield, low cost, and excellent reliability, so that the flexible and curved LCD is also one of the important development directions in the panel industry in the future.

SUMMARY

According to one aspect of the present disclosure, there is provided with a flexible substrate, including a color film substrate and a spacer provided on one side of the color film substrate. The spacer includes a first part and a second part that are intersected with each other.

According to one embodiment of the present disclosure, the first part and the second part are perpendicular to and intersected with each other.

According to one embodiment of the present disclosure, the color film substrate includes a BM that has a gate line pattern and a data line pattern that are intersected with each other. A position of the spacer corresponds to a crossing position of the gate line pattern and the data line pattern of the BM.

According to one embodiment of the present disclosure, an extension direction of the first part is identical to an extension direction of the gate line pattern of the BM. And/or an extension direction of the second part is identical to an extension direction of the data line pattern of the BM.

According to one embodiment of the present disclosure, a width of the first part is identical to a width of the gate line pattern of the BM. And/or a width of the second part is identical to a width of the data line pattern of the BM.

According to one embodiment of the present disclosure, the color film substrate includes a BM that has a plurality of gate line patterns and a plurality of data line patterns intersected with each other. The flexible substrate includes the plurality of spacers. A position of each of the spacers respectively corresponds to a crossing position of each of the gate line patterns and each of the data line patterns of the BM, and a plurality of the spacers are distanced from one to another.

According to one embodiment of the present disclosure, the spacer corresponds to a plurality of crossing positions of a plurality of the gate line patterns and a plurality of the data line patterns of the BM one by one.

According to one embodiment of the present disclosure, a circular intersection portion is formed at a crossing of the first part and the second part.

According to one embodiment of the present disclosure, an arc-shaped transition structure is formed at a crossing of the first part and the second part.

According to another aspect of the present disclosure, there is provided with a liquid crystal panel, including two flexible substrates that are assembled together in a manner of opposing to each other and a liquid crystal provided between the two flexible substrates. One of the two flexible substrates is an array substrate, and the other one of the two flexible substrates is a flexible substrate that comprises a color film substrate and a spacer. The spacer is supported between the flexible substrate and the array substrate.

BRIEF DESCRIPTION OF THE DRAWINGS

The various objects, features and advantages of the present disclosure will be apparent from the following detailed description of the preferable embodiments taken in conjunction with the accompanying drawings. The figures of the present disclosure are only illustrative, but not necessarily to scale. In the drawings, the same reference numbers will be used throughout the drawings to refer to the same or like parts. In which.

DETAILED DESCRIPTION

Typical embodiments embodying features and advantages of the present disclosure will be set forth in detail. It should be understood that various modifications may be made on different embodiments of the present disclosure without departing from the scope of the present disclosure, wherein the description and drawings in essential are used for description but not limit to the present disclosure.

Hereinafter, various exemplary embodiments of the present disclosure will be described with reference to the drawings constituting a part of the present disclosure, in which different exemplary structures, systems and steps of various aspects of the present disclosure can be realized in an exemplary example. It should be understood that other specific technical solutions of the components, structures, exemplary devices, systems, and steps may be used and can be structurally and functionally modified without departing from the scope of the present disclosure. Moreover, although the terms "upper", "lower", "between", etc. may be used in this specification to describe different exemplary features and elements of the present disclosure, these terms are used herein only for convenience, for example, the exemplary direction as described according to the drawings. It should not be understood from any content of the specification that particular three-dimensional direction requiring a structure falls within the scope of the present disclosure.

Figure 1:
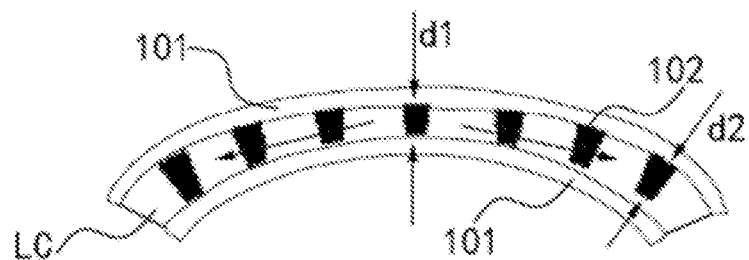
FIG. 1 is a partial sectional view of an existing curved surface LCD being bent.

Referring to FIG. 1, FIG. 1 shows a partial cross-sectional view of a liquid crystal cell (a structure configured that two flexible substrates 101 are provided opposite to each other and filled with liquid crystals therebetween) of the existing curved surface LCD as being bent. As shown in FIG. 1, the liquid crystal cell when being bent is forced unevenly, it is easy to cause a spacer 102 to be deformed unevenly such that a liquid crystal flows, and liquid crystal cell gaps at various positions of a screen vary, thereby a screen brightness of the entire display is uneven. As shown in FIG. 1, the liquid crystal when being bent has an extrusion force at a central position d1 of the liquid crystal cell greater than that on edge position of the liquid crystal cell, and the liquid crystal at the central position d1 flows to two sides, and thereby the liquid crystal cell gap on the edge position d2 is greater than the liquid crystal cell gap at the central position d1.

Figures 2A, 2B:
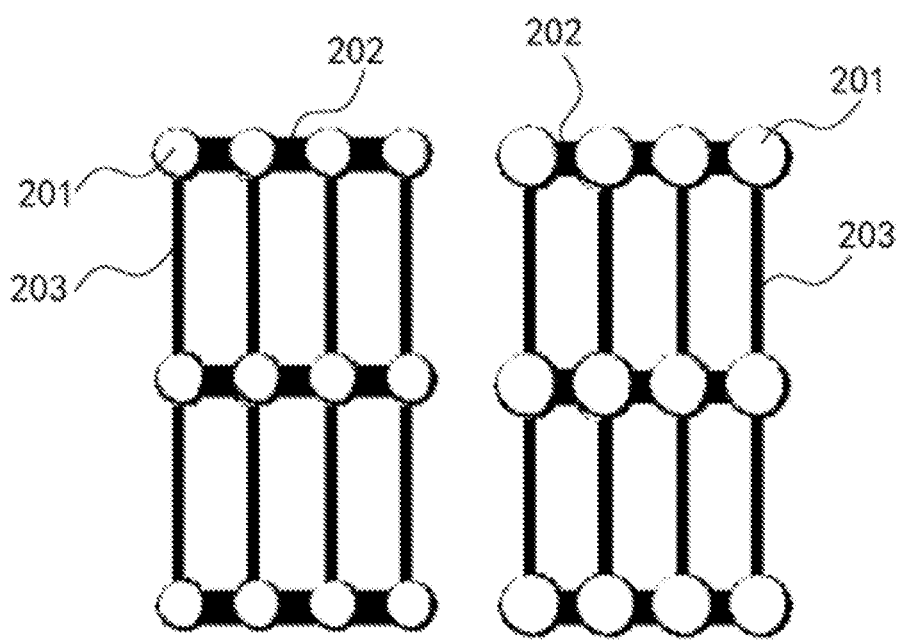
FIG. 2A and FIG. 2B are partial schematic views of another existing curved surface LCD.

Referring to FIG. 2A and FIG. 2B, FIG. 2A and FIG. 2B is a partial schematic view of another existing curved surface LCD, in particular, a schematic view representing that a color film substrate (provided with spacers 201) of the curved surface LCD corresponds to one pixel. As shown in FIG. 2A, a position of the spacer 201 on the color film substrate corresponds to a crossing position of a gate line pattern 202 and a data line pattern 203 of a black matrix (BM), and the spacer is substantially circular. With such structure, it is required to make an improvement as shown in FIG. 2B, that is, to increase size of the spacer 201, when supporting force of the spacer 201 being insufficient needs to be improved, at this moment, increasing a diameter of the circular spacer 201 has a limited enhancement of the supporting force, and excessively occupies the effective opening area of the pixel.

In order to solve various thickness of the liquid crystal cell as above described, there is also provided with an improved spacer with a wall structure, that is, a polymerization monomer and an initiator are added into the liquid crystal to form a polymer block by means of an UV process, such that flowing of the liquid crystal is limited when the curved surface LCD is bent, and uniformity of the liquid crystal cell gaps can be maintained. However, the above-mentioned improved design of the polymer wall requires adding a Mask in the process, and making a certain modification for the liquid crystal device, and needs to develop a new liquid crystal material.

Figure 3A:
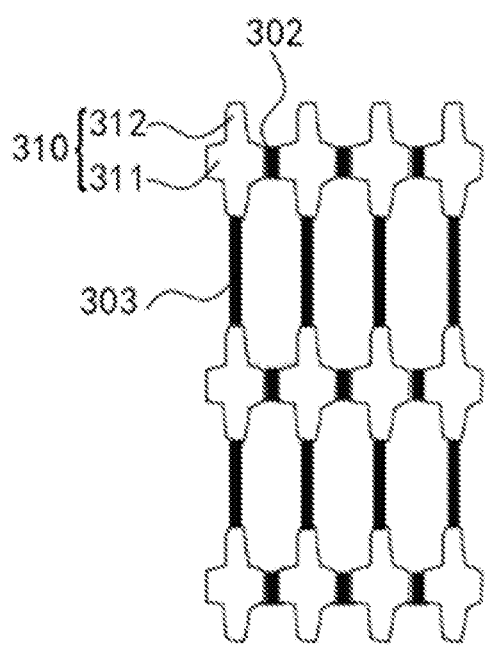
FIG. 3A is a partial schematic view of a flexible substrate according to an exemplary embodiment.

Referring to FIG. 3A, FIG. 3A representatively shows a partial schematic view of a flexible substrate as proposed in the present disclosure. In this exemplary embodiment, the flexible substrate as proposed in the present disclosure being used in a curved surface liquid crystal panel (i.e., the curved surface liquid crystal display) is described as an example. It will be appreciated for those skilled in the art that various modifications, additions, substitutions, deletions or other changes are made to the specific following implementations, and the changes are still within the scope of principle of the flexible substrate as proposed in the present disclosure, in order to apply the related design of the present disclosure to other similar display products, such as a flexible liquid crystal panel (i.e., the flexible liquid crystal display).

As shown in FIG. 3A, in the present embodiment, the flexible substrate of the present disclosure primarily refers to a color film substrate provided with a spacer 310 (also referred to as a wall) of a liquid crystal panel, that is, the flexible substrate mainly includes a color film substrate and a spacer 310 provided on one side of the color film substrate.

The color film substrate generally includes a flexible substrate (also referred to as a flexible substrate base plate or a flexible base plate, but the flexible base plate has a meaning different from the flexible substrate of the present disclosure), a BM, a color film, a common electrode and an orientation layer provided layer by layer. The stacked structure of the color film substrate as above mentioned may refer to the design of the existing LCD product, for example, the BM has a plurality of openings in which the color film is disposed, and the BM has a data line pattern 303 (Data BM) and a gate line pattern 302 (Gate BM) respectively corresponding to a data line and a gate line (both the data line and the gate line are provided on an array substrate).

As shown in FIG. 3A, in this embodiment, the spacer 310 is disposed on one side of the orientation layer of the color film substrate. When the flexible substrate and the array substrate (i.e., the other flexible substrate) are provided opposite to each other, the spacer 310 is supported between two layers of the flexible substrates. Specifically, each spacer 310 includes a first part 311 and a second part 312 that are intersected with each other, and the spacers 310 are arranged at a distance from each other.

For example, as shown in FIG. 3A, in this embodiment, the position of each spacer 310 preferably corresponds to the crossing position of each gate line pattern 302 and each data line pattern 303, and an extension direction of the first part 311 is identical to an extension direction of the gate line pattern 302, and an extension direction of the second part 312 is identical to an extension direction of the data line pattern 303. In addition, the first part 311 and the second part 312 of the spacer 310 are preferably perpendicular to each other, that is, the spacer 310 has a substantially " ┼ " shape, and also adaptive for a positional relationship of the gate line and the data line being perpendicular to each other.

As above described, when the first part 311 and the second part 312 of the spacer 310 are perpendicular to and intersected with each other, namely, the spacer 310 has a substantially " ┼ " shape structure, the supporting force of the spacer 310 can reach a greater level. And, based on the " ┼ " shape structure of the spacer 310, the first part 311 and the second part 312 are correspondingly arranged respectively along the gate line pattern 302 and the data line pattern 303, so as to further reduce loss of a pixel opening ratio caused by enhancement of the supporting force of the spacer 310 while the supporting force of the spacer 310 is optimized. Accordingly, when the curved surface liquid crystal panel is bent, the supporting forces of the spacer 310 intersect and extend along a direction of the gate line pattern 302 and the data line pattern 303 of the BM, so that it is possible to provide a greater supporting while the pixel opening area as occupied is minimized as possible, so as to ensure to maintain the cell thickness of the liquid crystal device of the flexible curved surface liquid crystal panel unchanged and avoid occurrence of uneven brightness of the display. In addition, there are gaps left between the spacers 310, so that the spacer 310 cannot affect diffusion of the liquid crystal in an ODF process after the flexible substrates are provided opposite to each other.

For example, as shown in FIG. 3A, in this embodiment, a width of the first part 311 matches a width of the gate line pattern 302 of the BM. Specifically, meaning of the width matched may be preferably equal to or slightly larger than, in order to ensure promotion of the supporting force of the spacer 310. As shown in FIG. 3A, a width of an end of the first part 311 is substantially equal to the width of the gate line pattern 302 of the BM, and a width of a middle part of the first part 311 (i.e., the portion that intersects with the second part 312) is slightly larger than the width of the BM gate. Thereby, strength of the spacer 310 can further be improved and the supporting force of the spacer 310 to the flexible substrate can be promoted, while the pixel opening area is not excessively occupied. In other embodiments, the width of the first part 311 may also be smaller than the width of the gate line pattern 302 of the BM, which is not limited to this embodiment.

For example, as shown in FIG. 3A, in this embodiment, a width of the second part 312 matches a width of the data line pattern 303 of the BM. Specifically, the meaning of the width matched may be preferably equal to or slightly larger than, in order to promote the supporting force of the spacer 310. As shown in FIG. 3A, a width of an end of the second part 312 is substantially equal to the width of the data line pattern 303 of the BM, and a width of a middle part of the second part 312 (i.e., the portion that intersects with the first part 311) is slightly larger than the width of the data line pattern 303 of the BM. Thereby, strength of the spacer 310 can further be improved and the supporting force of the spacer 310 to the flexible substrate can be promoted, while the pixel opening area is not excessively occupied. In other embodiments, the width of the second part 312 may also be smaller than the width of the data line pattern 303 of the BM, which is not limited to this embodiment.

Figure 3B:
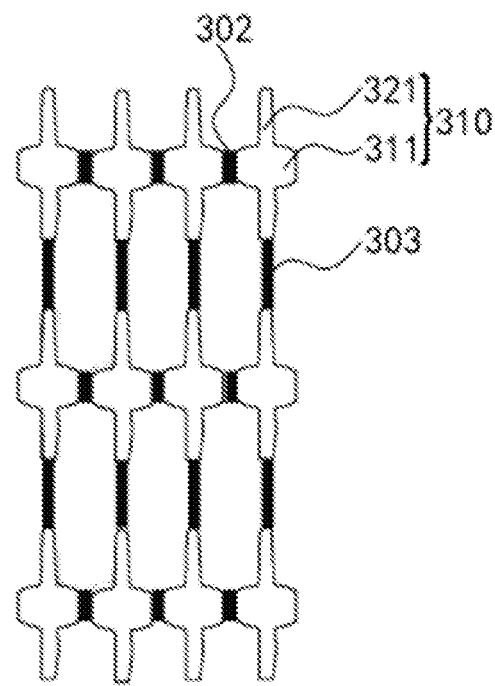
FIG. 3B is a partial schematic view of a flexible substrate according to another exemplary embodiment.

In addition, referring to FIG. 3B, FIG. 3B representatively shows a partial schematic view of another implementation of the flexible substrate according to the present disclosure. As shown in FIG. 3B, the width and the length of the first part 311 and the second part 312 of the spacer 310 in the present embodiment may be appropriately varied according to different requirements for the supporting force and the pixel opening area, so that the size of the spacer 310 is not limited to the embodiments as shown in FIG. 3A and FIG. 3B.

Figures 4A, 4B:
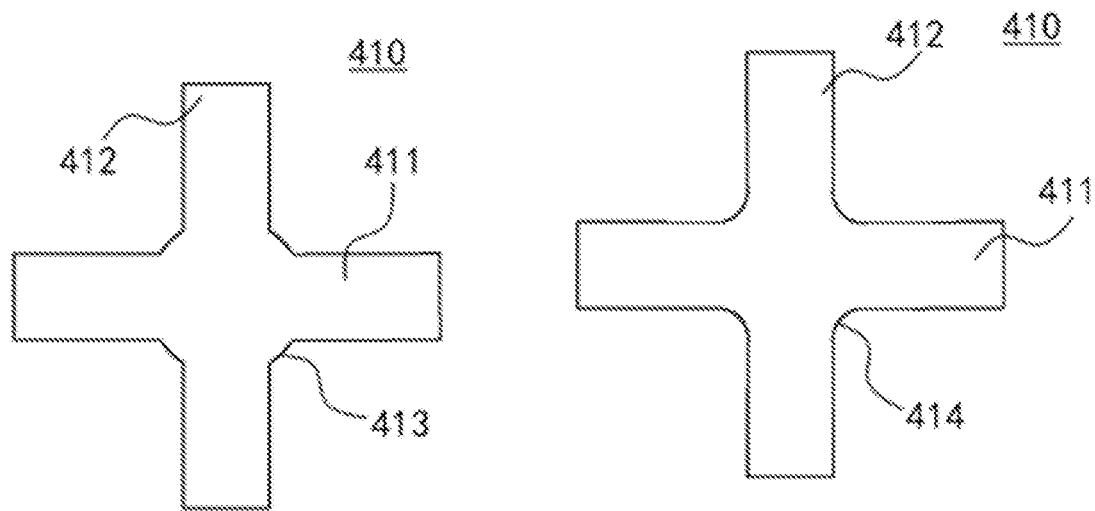
FIG. 4A is a schematic view of a spacer of the flexible substrate according to a further exemplary embodiment.
FIG. 4B is a schematic view of a spacer of the flexible substrate according to a further exemplary embodiment.

In order to further optimize the supporting force and stress condition of the spacer, various modifications or improvements may be made to the structure of the spacer. For example, referring to FIG. 4A and FIG. 4B, FIG. 4A is a schematic view respectively showing the flexible substrate as proposed in the present disclosure in the spacer according to a further exemplary implementation. FIG. 4B is a schematic view representatively showing the flexible substrate as proposed in the present disclosure in the spacer according to further exemplary implementation.

As shown in FIG. 4A, in this embodiment, a circular intersection portion 413 is provided at the crossing of the first part 411 and the second part 412 of the spacer 410. Specifically, the size of the circular intersection portion part 413 is slightly larger than the width of the first part 411 and the second part 412, so that the connection of the first part 411 and the second part 412 is presented in an arc shape relatively protruded outwardly, so as to enhance the supporting force of the spacer 410, and also improve the stress condition at the connection between the first part 411 and the second part 412 to avoid stress concentration. In other embodiments, the circular intersection portion 413 may also employ other shapes, such as rectangle, diamond, and ellipse shape, etc., which is not limited to this embodiment.

As shown in FIG. 4B, in this embodiment, an arc-shaped transition portion 414 is provided at the crossing of the first part 411 and the second part 412 of the spacer 410. Specifically, the arc-shaped transition portion 414 is respectively disposed at four corners formed at the crossing of the first part 411 and the second part 412, to substitute the arc-shaped transition portion for the corner crossing, so as to reinforce the supporting force of the spacer 410, and also improve the stress condition at the connection between the first part 411 and the second part 412 to avoid stress concentration.

It should be noted that the flexible substrate as shown in the drawings and described in the specification are just a few of examples of various flexible substrates that can employ principles of the present disclosure. It should be appreciated that the principle of the present disclosure is absolutely not only limited to any detail or any component of the flexible substrate as shown in the drawings or as described in this specification.

For example, in some of the present embodiments, the flexible substrate may also include a transparent conductive film or the like. When the flexible substrate is of a TN type, if two layers of the transparent conductive films (i.e., positive and negative conductive films) are respectively provided on two layers of the flexible substrates (the array substrate and the flexible substrate of the present disclosure), the spacer is supported between two layers of the transparent conductive films of the two layers of the flexible substrates. When the flexible substrate is of an IPS or its derivative type, if the positive and negative conductive films may be located on glass substrates (generally referring to a TFT substrate) on the same side, the spacer is supported between the two layers of the flexible substrates.

In combination with the exemplary description relating to the flexible substrate, and referring to FIG. 3A and FIG. 3B, exemplary description of the liquid crystal panel according to the present disclosure will be provided below. In this exemplary embodiment, the liquid crystal panel as proposed in the present disclosure being used in a curved surface liquid crystal panel (i.e., the curved surface liquid crystal display) is described as an example. It will be appreciated for those skilled in the art that various modifications, additions, substitutions, deletions or other changes are made to the specific implementations, and the changes are still within the scope of principle of the liquid crystal panel as proposed in the present disclosure, in order to apply the related design of the present disclosure to other similar display products, such as a flexible liquid crystal panel (i.e., the flexible liquid crystal display).

Wherein, the liquid crystal panel as proposed in the present disclosure mainly includes two flexible substrates and a liquid crystal disposed between the two flexible substrates. One of the two flexible substrates is the flexible substrate as proposed in the present disclosure, and the other of the two flexible substrates is an array substrate that may adopt a design of the existing LCD device, which will be omitted herein. The liquid crystal panel is formed substantially by the two flexible substrates that are provided opposite to each other and by providing with the liquid crystals. The main parts of the flexible substrate and the structure, the connection mode, and the functional relationship of the other parts of the curved surface liquid crystal panel associated with the flexible substrate all may refer to the above exemplary description of the flexible substrate, which will be omitted.

In addition, the liquid crystal panel as proposed in the present disclosure may be used in a curved surface liquid crystal panel or a flexible liquid crystal panel. In other embodiments, the liquid crystal panel may also be an ordinary liquid crystal panel.

It should be noted that the liquid crystal panel as shown in the drawings and described in the specification are just a few of examples of various liquid crystal panels that can employ principles of the present disclosure. It should be appreciated that the principle of the present disclosure is absolutely not only limited to any detail or any component of the liquid crystal panel as shown in the drawings or as described in this specification.

As above described, the flexible substrate and the liquid crystal panel with the flexible substrate according to the present disclosure, by means of the design of the spacer having the first part and the second part that are intersected with each other, can enhance the supporting force of the spacer, and improve a holding capability of the liquid crystal cell gaps after the liquid crystal panels are provided opposite to each other, and thereby ensuring that the curved surface and flexible liquid crystal panels when being bent cannot bring about the uneven screen brightness due to that the above-mentioned holding capacity is insufficient.

For example, according to one implementation of the present disclosure, when the first part and the second part of the spacer are perpendicular to and intersected with each other, namely, the spacer has a substantially " |· " shape structure, the supporting force of the spacer can reach a greater level.

Furthermore, as an example, according to one implementation of the present disclosure, based on " |· " shape structure of the spacer, the first part and the second part are correspondingly arranged respectively along the gate line pattern and the data line pattern of the BM, so as to further reduce loss of a pixel opening ratio caused by enhancement of the supporting force of the spacer while the holding capability of the liquid crystal cell gaps is optimized.

Exemplary embodiments of the flexile substrate and the liquid crystal panel having the flexible substrate as proposed by the present disclosure are described and/or illustrated in detail. However, the embodiments of the present disclosure are not limited to the specific embodiments as described herein. Rather, the constituents and/or steps of each embodiment may be used independently and separately from the other constituents and/or steps as described herein. Each constituent and/or step of one embodiment may also be used in combination with other constituents and/or steps of the other embodiments. As introducing the elements/constituents and the like as described and/or shown in the drawings, the terms "a", "an", "the", "said" and "at least one", when describing element/ constituent/ or the like as described and/or shown herein, are used to express the presence of one or more the element/ constitute/ or the like. The terms "include", "comprise" and "have", as used herein, are intended to be inclusive, and mean there may be additional elements/ constituents/ or the like other than the listed elements/ constituents/ or the like.

Although the flexible substrate and the liquid crystal panel having the flexible substrate as proposed by the present disclosure are disclosed according to different particular embodiments, those skilled in the art would recognize that the implementations of present disclosure can be modified within the spirit and scope of the claims.

What is claimed is:

1. A flexible substrate, comprising a color film substrate and a spacer provided on one side of the color film substrate,
wherein the spacer is of a cross shape and is defined by a first exterior edge, a second exterior edge, a third exterior edge, a fourth exterior edge, a fifth exterior edge, a sixth exterior edge, a seventh exterior edge, and an eighth exterior edge,
wherein the fifth exterior edge connects between the first exterior edge and the second exterior edge, the sixth exterior edge connects between the second exterior edge and the third exterior edge, the seventh exterior edge connects between the third exterior edge and the fourth exterior edge, the eighth exterior edge connects between the fourth exterior edge and the first exterior edge,
wherein the fifth exterior edge, the sixth exterior edge, the seventh exterior edge, and the eighth exterior edge are arc shaped,
wherein the color film substrate comprises a black matrix (BM) that has a gate line pattern and a data line pattern intersected with each other;
where a position of the spacer corresponds to a crossing position of the gate line pattern and the data line pattern of the BM,
wherein an extension direction from the second exterior edge to the fourth exterior edge is identical to an extension direction of the data line pattern of the BM,
wherein a width of the second exterior edge is identical to a width of the data line pattern of the BM, a width of the fourth exterior edge is identical to the width of the data line pattern of the BM.

2. The flexible substrate according to claim 1, wherein an extension direction from the first exterior edge to the third exterior edge and the extension direction from the second exterior edge to the fourth exterior edge are perpendicular to each other.

3. The flexible substrate according to claim 1, wherein an extension direction from the first exterior edge to the third exterior edge is identical to an extension direction of the gate line pattern of the BM.

4. The flexible substrate according to claim 1, wherein a width of the first exterior edges is identical to a width of the gate line pattern of the BM, a width of the third exterior edges is identical to the width of the gate line pattern of the BM.

5. The flexible substrate according to claim 1, wherein the color film substrate comprises a BM (black matrix) that has a plurality of gate line patterns and a plurality of data line patterns intersected with each other,
wherein the flexible substrate comprises a plurality of spacers,
a position of each of the spacers respectively corresponds to a crossing position of each of the gate line patterns and each of the data line patterns of the BM, and a plurality of the spacers are distanced from one to another.

6. The flexible substrate according to claim 5, wherein positions of the spacers correspond to crossing positions of a plurality of the gate line patterns and a plurality of the data line patterns of the BM one by one.

7. A liquid crystal panel, comprising two flexible substrates that are assembled together in a manner of opposing to each other and a liquid crystal provided between the two flexible substrates,
wherein one of the two flexible substrates is an array substrate, and the other one is a flexible substrate,
the flexible substrate comprises a color film substrate and a spacer,
the spacer is supported between the flexible substrate and the array substrate,
wherein the spacer is of a cross shape and is defined by a first exterior edge, a second exterior edge, a third exterior edge, a fourth exterior edge, a fifth exterior edge, a sixth exterior edge, a seventh exterior edge, and an eighth exterior edge,
wherein the fifth exterior edge connects between the first exterior edge and the second exterior edge, the sixth exterior edge connects between the second exterior edge and the third exterior edge, the seventh exterior edge connects between the third exterior edge and the fourth exterior edge, the eighth exterior edge connects between the fourth exterior edge and the first exterior edge, wherein the fifth exterior edge, the sixth exterior edge, the seventh exterior edge, and the eighth exterior edge are arc shaped, wherein the color film substrate comprises a BM (black matrix) that has a gate line pattern and a data line pattern intersected with each other;

where a position of the spacer corresponds to a crossing position of the gate line pattern and the data line pattern of the BM, wherein an extension direction from the second exterior edge to the fourth exterior edge is identical to an extension direction of the data line pattern of the BM, wherein a width of the second exterior edge is identical to a width of the data line pattern of the BM, and a width of the fourth exterior edge is identical to a width of the data line pattern of the BM.

8. The liquid crystal panel according to claim 7, wherein an extension direction from the first exterior to the third exterior edge and the extension direction of the second exterior edge to the fourth exterior edge are perpendicular to each other.

9. The liquid crystal panel according to claim 7, wherein an extension direction from the first exterior edge to the third exterior edge is identical to an extension direction of the gate line pattern of the BM.

10. The liquid crystal panel according to claim 7, wherein a width of the first exterior edge is identical to a width of the gate line pattern of the BM, a width of the third exterior edge is identical to the width of the gate line pattern of the BM.

11. The liquid crystal panel according to claim 7, wherein the color film substrate comprises a BM (black matrix) that has a plurality of gate line patterns and a plurality of data line patterns intersected with each other, wherein the liquid crystal panel comprises a plurality of spacers, a position of each of the spacers respectively corresponds to a crossing position of each of the gate line patterns and each of the data line patterns of the BM, and a plurality of the spacers are distanced from one to another.

12. The liquid crystal panel according to claim 11, wherein positions of the spacers correspond to crossing positions of a plurality of the gate line patterns and a plurality of the data line patterns of the BM one by one.

* * * * *